(12) United States Patent
Na

(10) Patent No.: US 10,201,047 B2
(45) Date of Patent: Feb. 5, 2019

(54) FLUSHMOUNTED BOX COVER ON WHICH THE ELECTROLUMINESCENCE PLATE IS AFFIXED

(71) Applicant: Hugo Joo Na, Los Angeles, CA (US)

(72) Inventor: Hugo Joo Na, Los Angeles, CA (US)

( * ) Notice: Subject to any disclaimer, the term of this patent is extended or adjusted under 35 U.S.C. 154(b) by 0 days.

(21) Appl. No.: 15/614,998

(22) Filed: Jun. 6, 2017

(65) Prior Publication Data
US 2018/0352620 A1    Dec. 6, 2018

(51) Int. Cl.
*H05B 33/08* (2006.01)
*F21S 8/02* (2006.01)

(52) U.S. Cl.
CPC .......... *H05B 33/0815* (2013.01); *F21S 8/024* (2013.01)

(58) Field of Classification Search
CPC ....... H05B 33/0815; F21S 8/024; H02G 3/14; G09F 13/04; G09F 13/22; H01H 2009/186; H01R 13/717
See application file for complete search history.

(56) References Cited

U.S. PATENT DOCUMENTS

| | | | | |
|---|---|---|---|---|
| 2,441,809 A * | 5/1948 | Gillin | ...................... | H01G 2/04 174/395 |
| 2,806,941 A * | 9/1957 | Graziani | ................. | F21S 8/033 362/432 |
| 3,197,549 A * | 7/1965 | Good | ....................... | H02G 3/14 174/66 |
| 4,084,406 A * | 4/1978 | Brenneman | ......... | F04D 27/0284 318/779 |
| 4,479,317 A * | 10/1984 | Hanna | ...................... | G09F 3/00 1/66 |
| 5,574,256 A * | 11/1996 | Cottone | ............ | H01R 13/6395 174/53 |
| 5,670,776 A * | 9/1997 | Rothbaum | .............. | F21S 8/035 250/214 AL |
| 5,683,166 A * | 11/1997 | Lutzker | .................. | H05B 33/06 250/466.1 |
| 6,087,588 A * | 7/2000 | Soules | ................... | H01H 9/185 174/66 |
| 6,423,900 B1 * | 7/2002 | Soules | ................... | H01H 9/185 174/66 |
| 2003/0042038 A1 * | 3/2003 | Masson | .................... | H02G 3/14 174/66 |
| 2005/0207136 A1 * | 9/2005 | Jasper | ..................... | G09F 13/04 362/23.15 |
| 2009/0145624 A1 * | 6/2009 | Chung | .................. | H02G 3/126 174/58 |
| 2009/0194312 A1 * | 8/2009 | Jolly | ....................... | H02G 3/14 174/67 |

\* cited by examiner

*Primary Examiner* — Orlando Bousono

(57) ABSTRACT

A flushmounted box includes a wall switch cover, a transparent conductor plate having a first electric line, and an electroluminescence substance plate is attached on a rear surface of the transparent conductor plate, and a first opaque conductor plate is attached on a rear surface the electroluminescence substance plate and a dielectric plate is attached on a rear surface of the first opaque conductor plate and a second opaque conductor plate is a rear surface of the dielectric plate and a second electric line which is connected the second opaque conductor.

2 Claims, 21 Drawing Sheets

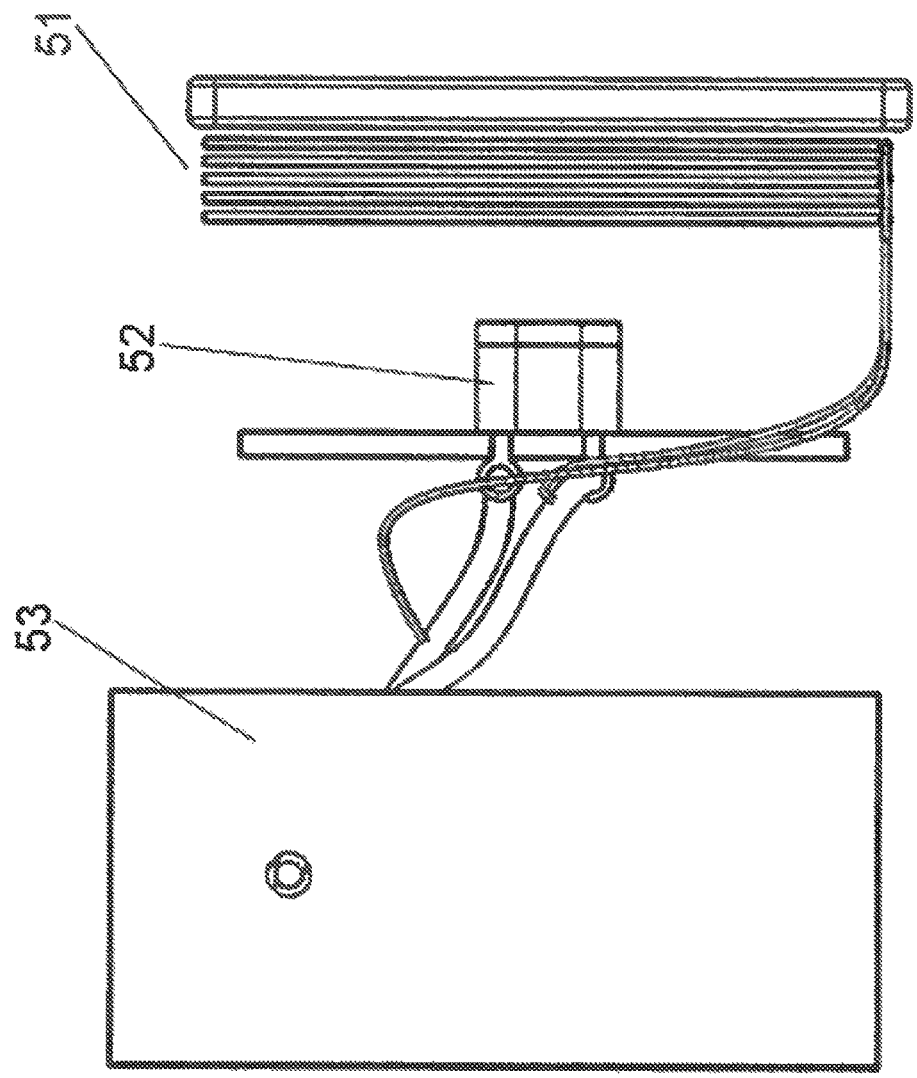

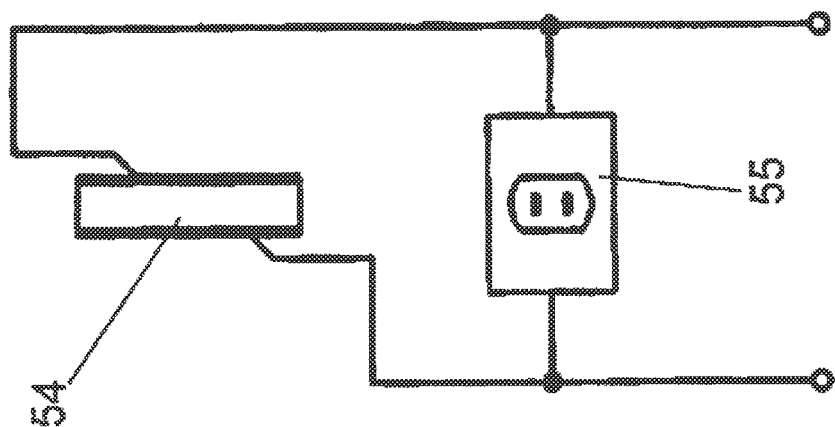

FLUSHMOUNTED BOX COVER ON WHICH THE ELECTROLUMINESCENCE PLATE IS AFFIXED

CROSS REFERENCE TO RELATED APPLICATIONS NOT APPLICABLE

Field of Invention

The present invention is a product used as a cover of flushmounted box which is already equipped in the wall of the established building, which is designed to emit a light by affixing an electroluminescence plate on the cover of the flushmounted box of the already established wall switch or power outlet.

Background of Invention

A wall switch and outlet is widely used in the house, office or building.

It is very difficult to find out a wall switch or an outlet if a certain place became dark at night or there is no light in the area.

The flushmounted box cover on which the electroluminescence plate is affixed is designed for people to find out a wall switch or an outlet easily at night or in the dark area while the flushmounted cover emits a light continuously In addition, the flushmounted box cover on which the electroluminescence plate is affixed is also designed to identify whether or not the power is energized into the flushmounted box in the wall as people identify a light that the flushmounted box cover emits.

The present inventor initially used the electroluminescence plate only, which is combined with a wall switch cover or outlet cover. Then the inventor attached a ready-made condenser on an electricity line which is connected to an electroluminescence plate. By using this method, a capacitance is produced and regardless of the change of alternating current voltage, as the invention of attaching a ready-made condenser on the electric line constantly limits the alternating current, the electroluminescence plate is designed to constantly emit a light.

The present inventor does not claim the method of attaching a condenser to the electroluminescence plate but just describe it as the background of the present invention only.

The electroluminescence plate consists of first, a transparent conductor plate, second, electroluminescence substance plate and third, at the back of electroluminescence substance plate, an opaque conductor plate.

The present inventor submits the technology and composition of electroluminescence plate as the background of the present invention.

SUMMARY OF INVENTION

The purpose of present invention is to make it possible for people to find out the location of a wall switch or an outlet easily while a flushmounted box cover on which the electroluminescence plate is affixed continuously emits a light.

The merits of the flushmounted box cover on which the electroluminescence plate is affixed follow as:

First, the flushmounted box cover does not prevent people from sleeping at night because it emits a tiny light Second, the flushmounted box cover does not give an economic burden to its owner because the usage of electric power is minute.

Third, the flushmounted box cover makes it convenient for people to move or act at night or in the dark by help of the light only which originates from the flushmounted box cover without any other lighting device.

BRIEF DESCRIPTION OF DRAWINGS

Various features, aspects and merits of present invention is better understood by referring to the attached drawings.

FIG. 20 shows a side elevation view of a flushmounted box, an outlet, outlet cover on which the electroluminescence plate with a dielectric plate and a conductor plate is affixed.

FIG. 21 shows a circuit diagram in which an outlet is connected to the outlet cover on which the electroluminescence plate with a dielectric and a conductor plate is affixed.

DETAILED DESCRIPTION EMBODIMENTS OF INVENTION

Figure 1:
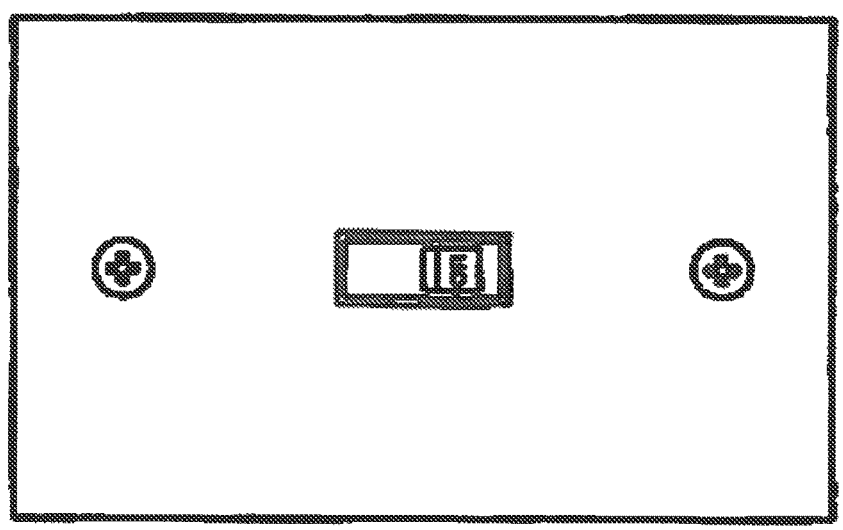
FIG. 1 shows a front view of outer shape of a wall switch
Figure 2:
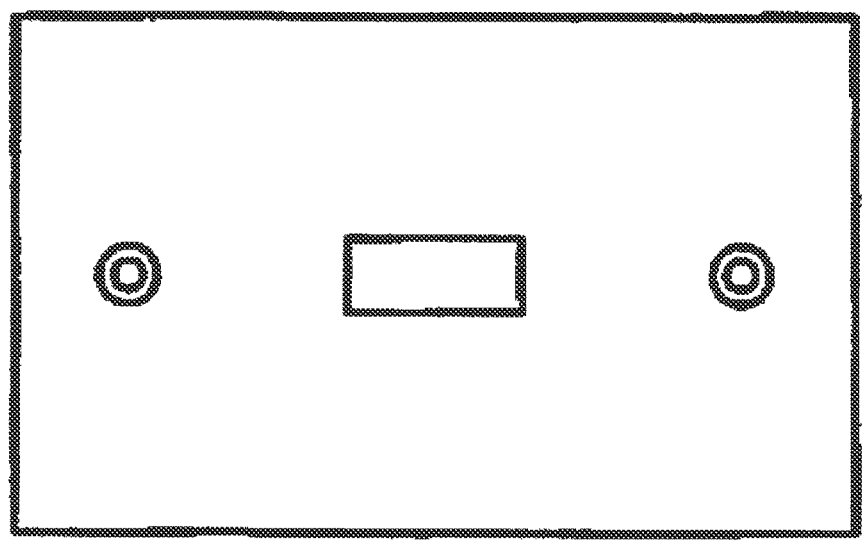
FIG. 2 shows an anterior view of a wall switch cover
Figure 3:
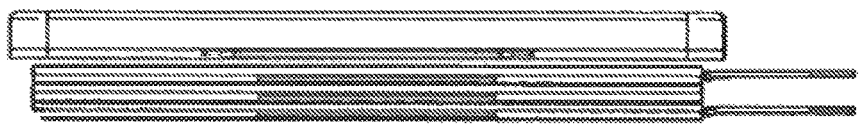
FIG. 3 shows a side elevational view of the wall switch cover on which the electroluminescence plate is affixed
Figure 4:
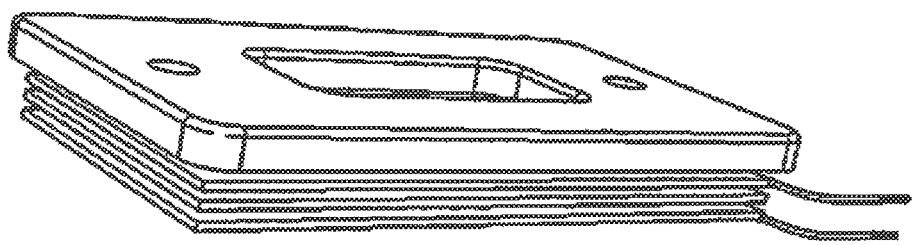
FIG. 4 shows a perspective view of the wall switch cover on which the electroluminescence plate is affixed.
Figure 5:
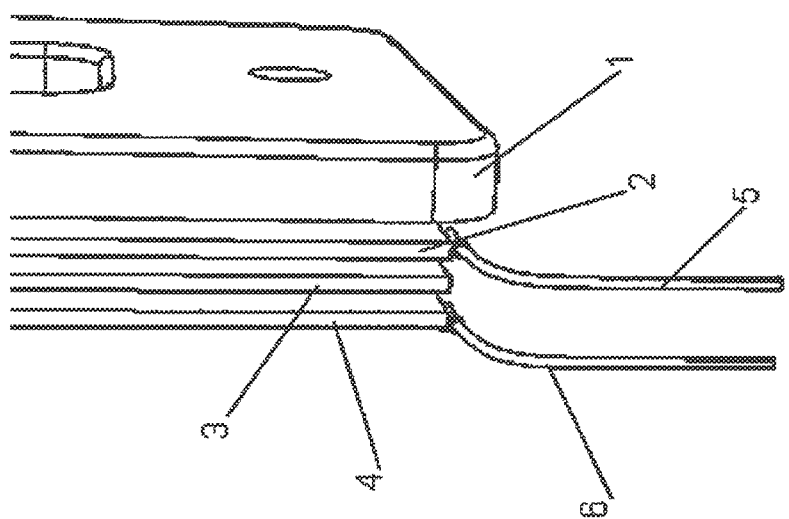
FIG. 5 shows an enlarged perspective view of the wall switch cover on which the electroluminescence plate is affixed.

On the rear surface (FIG. 2) of the wall switch cover (FIG. 1), the electroluminescence plate indicated in FIGS. 3, 4 and 5 are affixed as follows:

On the rear surface of wall switch cover 1, a transparent conductor plate 2 is affixed, to which an electric line 5 is attached. Second, on the rear surface of the transparent conductor plate 2, an electroluminescence substance plate 3 is affixed. Third, on the rear surface of the electroluminescence substance plate 3, an opaque conductor plate 4 is affixed, to which an electric line 6 is attached.

Figure 6:
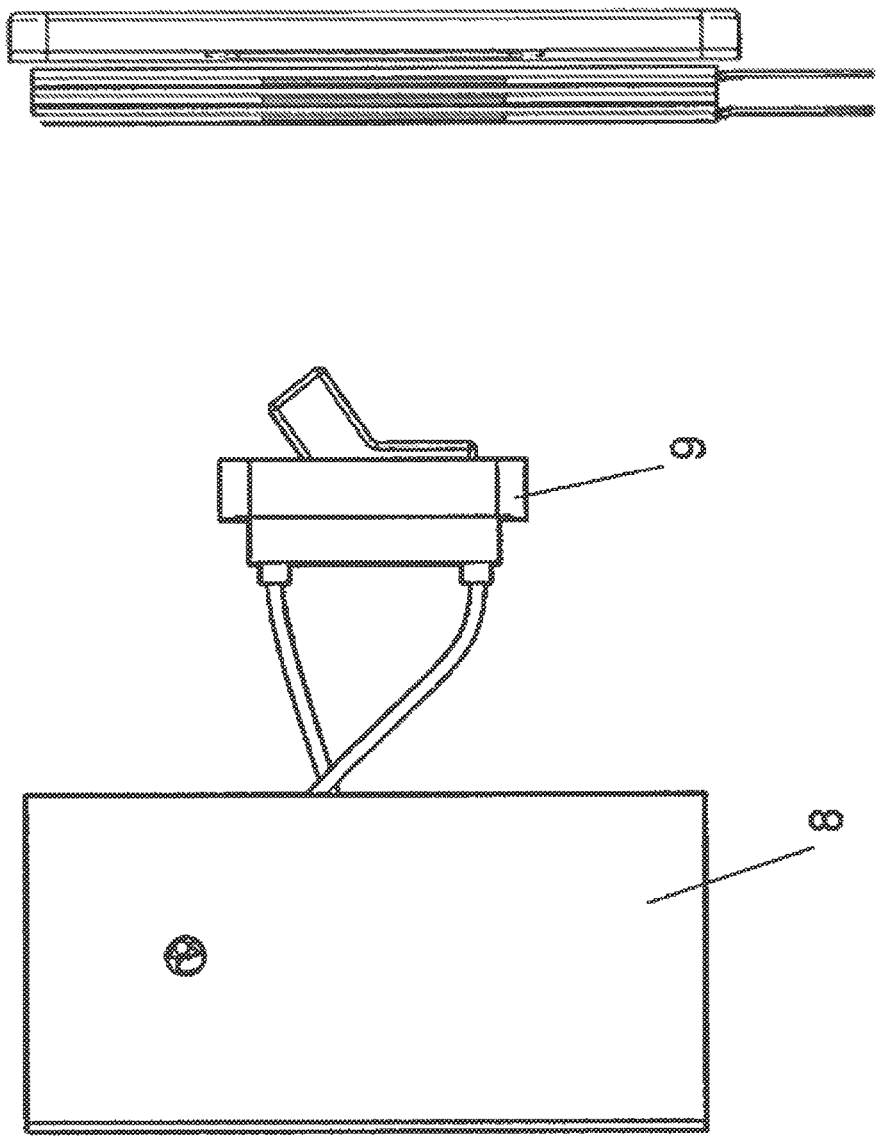
FIG. 6 shows a side elevation view of a flushmounted box, a switch and a wall switch cover on which the electroluminescence plate is affixed
Figure 7:
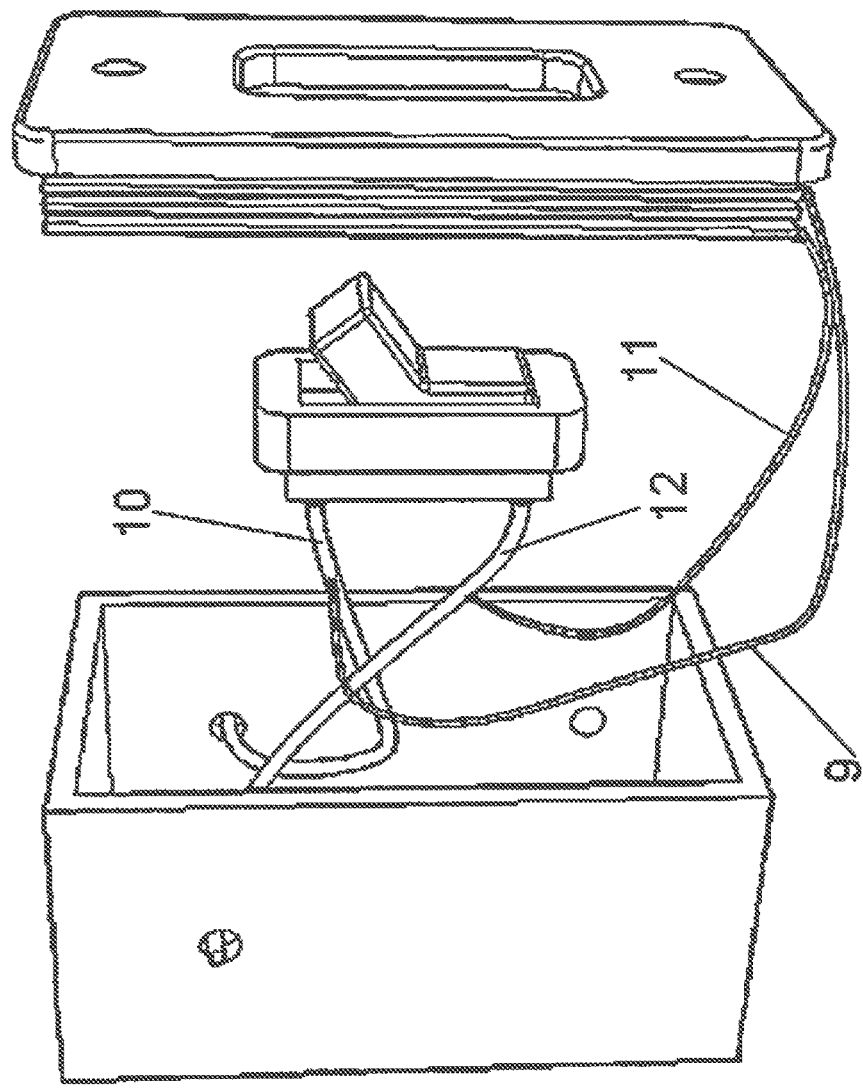
FIG. 7 shows a detailed perspective view of lines connecting between a switch and a wall switch cover on which the electroluminescence plate is affixed.

As shown in the FIG. 6, 7, when the flushmounted box 8, a wall switch 9 and the switch cover on which the electroluminescence plate is affixed are connected through electric lines, the wall switch power line 10 is connected to the electric line 9 originating from the wall switch cover on which the electro luminescence plate is affixed and the other electric line 11 originating from the electroluminescence plate is connected to the other power line 12 of wall switch.

Figure 13:
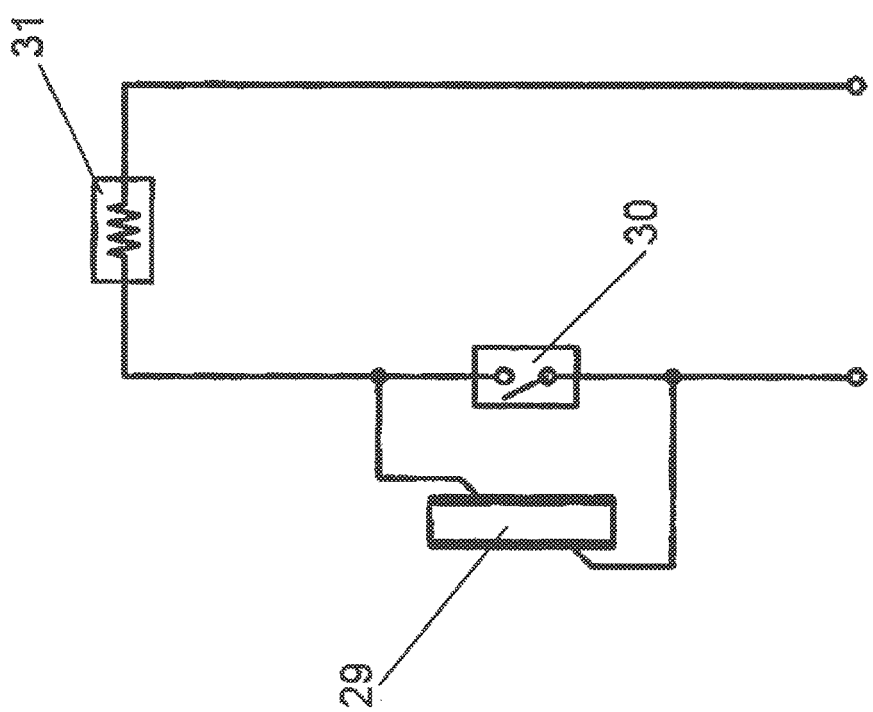
FIG. 13 shows a circuit diagram in which the wall switch is connected to the wall switch cover in which the electroluminescence plate or the electroluminescence with a dielectric plate and a conductor plate is affixed.

FIG. 13 shows the circuit diagram of the wall switch cover 30 on which the electroluminescence plate 29 is affixed. The load 31 controlled by a wall switch represents all kinds of electric products lite an electric light or an electric heater.

When the wall switch 30 became off, the electric power is blocked on load 31, however, the electric luminescence plate comes to emit a light as the voltage passing through the load 31 is energized into both electric lines of the electric luminescence plate 29.

On the other hand, when the wall switch 30 became on, the electroluminescence plate 29 does not emit a light anymore as the electric power is cut off because the voltage energized into electric lines of electroluminescence plate 29 becomes short.

Figure 8:
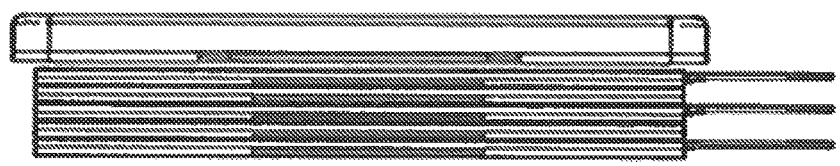
FIG. 8 shows a side elevational view of the wall switch cover on which the electroluminescence plate with a dielectric plate and a conductor plate is affixed
Figure 9:
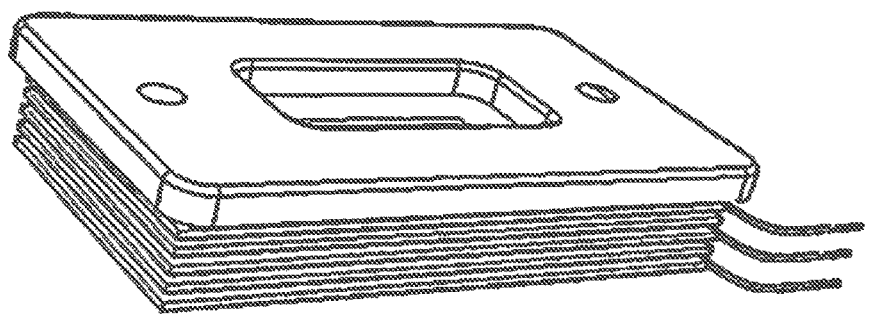
FIG. 9 shows a perspective view of the wall switch cover on which the electroluminescence plate with a dielectric plate and a conductor plate is affixed.
Figure 10:
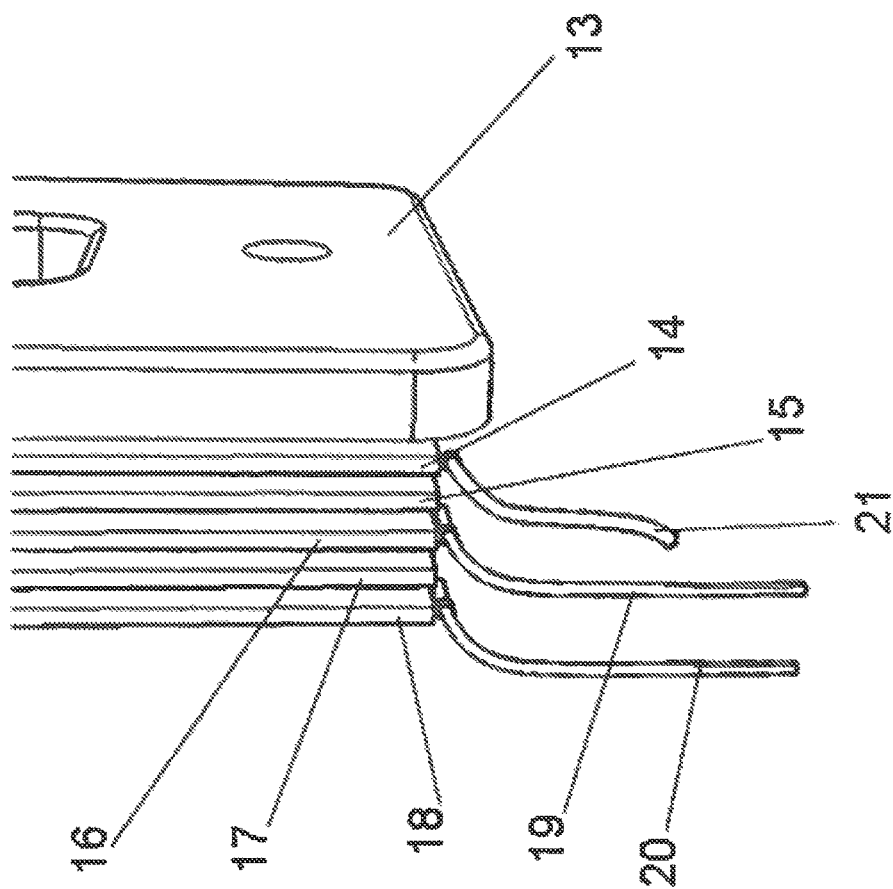
FIG. 10 shows an enlarged perspective view of electric lines connected to the wall switch on which the electroluminescence plate with a dielectric plate and a conductor plate is affixed.

FIGS. 8, 9 and 10 shows that the electroluminescence plate with a dielectric plate and a conductor plate is affixed with a wall switch cover.

On the rear surface (FIG. 2) of the wall switch cover (FIG. 1), the electroluminescence plate with a dielectric plate and a conductor plate indicated in FIGS. 8, 9 and 10 are affixed as follows:

On the rear surface of wall switch cover 13, a transparent conductor plate 14 is affixed, to which an electric line 21 is attached. Second, on the rear surface of the transparent conductor plate 14, an electroluminescence substance plate 15 is affixed. Third, on the rear surface of the electroluminescence plate 15, an opaque conductor plate 16 is affixed, to which an electric line 19 is attached.

Fourth, on the rear surface of the opaque conductor plate 16, a dielectric substance plate 17 is affixed. Fifth, on the rear surface of the dielectric substance plate 17, a conductor plate 18 is affixed, to which an electric line 20 is attached. Due to the property of dielectric substance plate 17, an capacitance is formed between the opaque conductor plate 16 which is accessed to the electric line 19 and the conductor plate 18 which is accessed to the electric line 20.

Due to the formed capacitance between the opaque conductor plate 16 and the conductor plate 18, the electroluminescence substance plate 18 to which the electric field is applied emits a light if the positive and negative power are respectively energized to an electric line 20 connected to the conductor plate 18 and the electric line 21 connected to the transparent conductor plate 14 while the opaque conductor plate 16 is not energized by any power.

Figure 11:
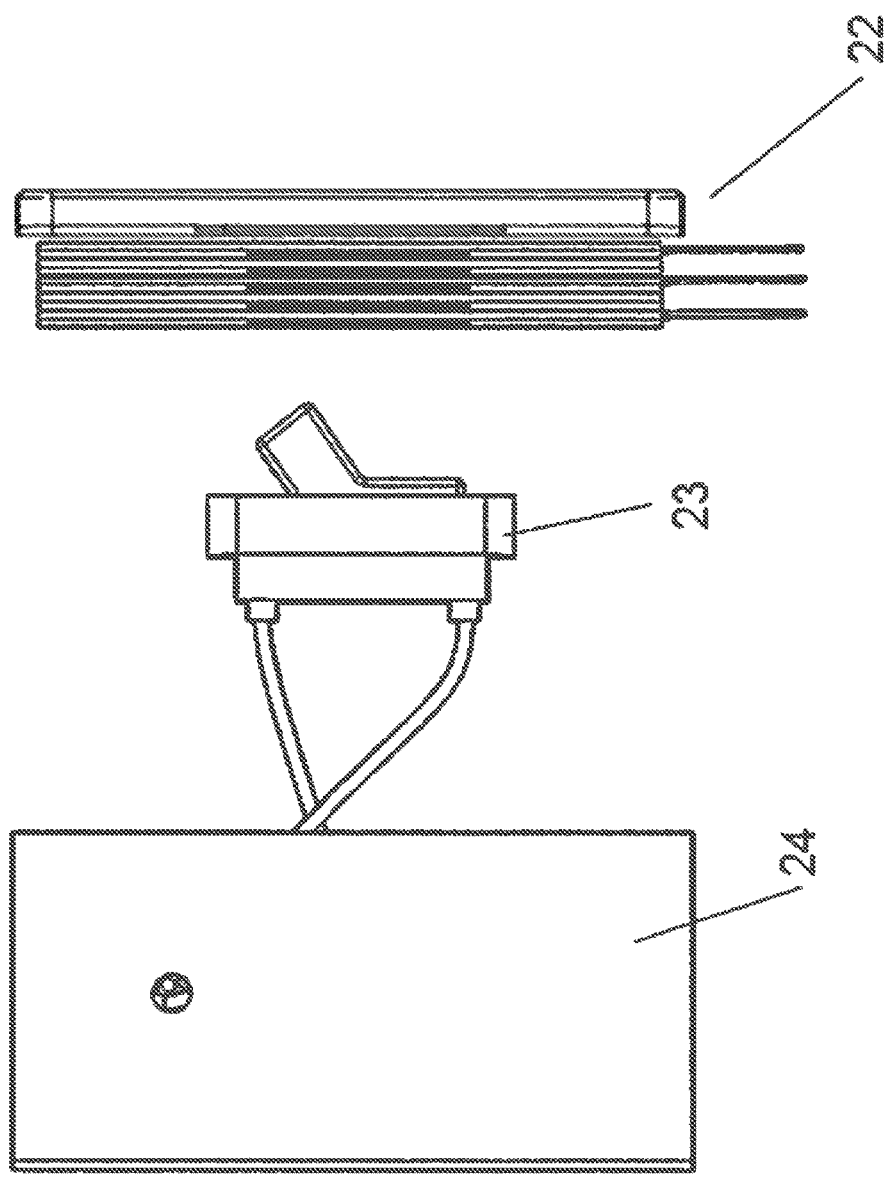
FIG. 11 shows a side elevation view of a flushmounted box, a switch and a wall switch cover on which the electroluminescence plate with a dielectric plate and a conductor plate is affixed.
Figure 12:
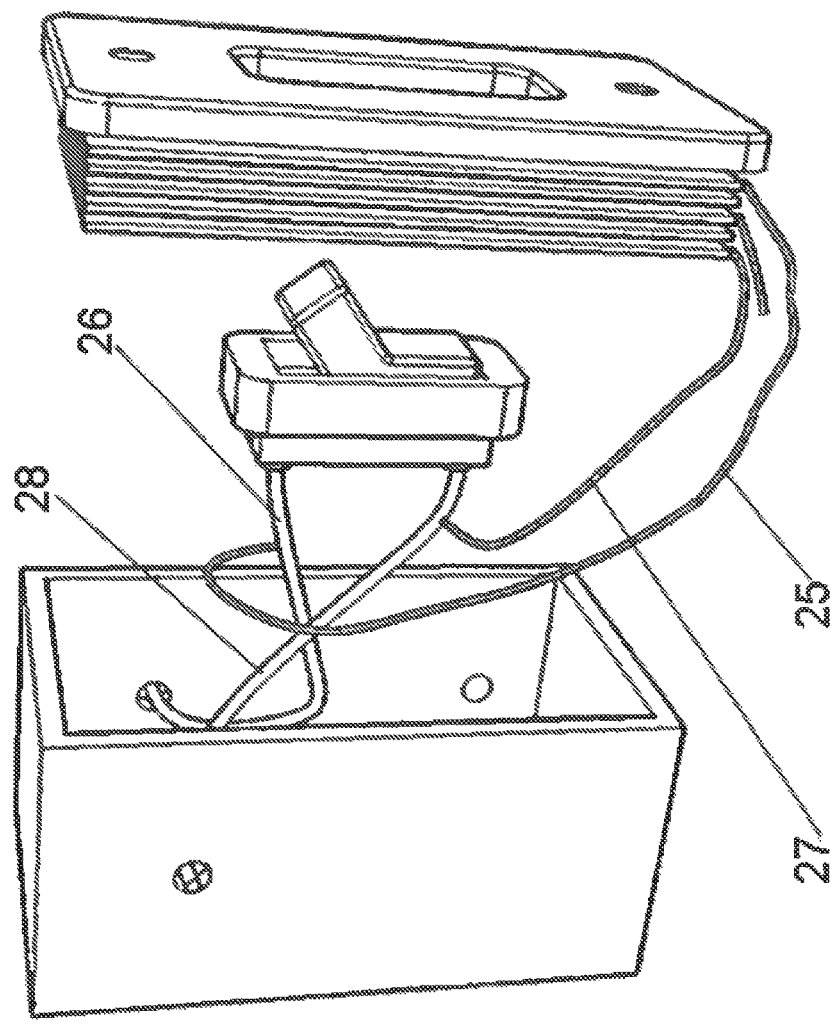
FIG. 12 shows a detailed perspective view of lines connecting between a switch and a wall switch cover on which the electroluminescence plate with a dielectric plate and a conductor plate is affixed.

As shown in the FIGS. 11 and 12, when the flushmounted box 24, a wall switch 23 and the switch cover 22 on which the electroluminescence plate with a dielectric and a conductor plate is affixed are connected through electric lines, the wall switch power line 26 are connected to the electric line 25 originating from the wall switch cover on which the electro luminescence plate is affixed and the other electric line 27 originating from the electroluminescence plate are connected to the other power line 28 of wall switch.

FIG. 13 shows the circuit diagram of the wall switch cover 30 on which the electroluminescence plate 29 is affixed. The load 31 controlled by a wall switch represents all kinds of electric products like an electric light or an electric heater.

When the wall switch 30 became off, the electric power is blocked on load 31, however, the electric luminescence plate comes to emit a light as the voltage passing through the load 31 is energized into both electric lines of the electric luminescence plate 29.

On the other hand, when the wall switch 30 became on, the electroluminescence plate 29 does not emit a light anymore as the electric power is cut off because the voltage energized into electric lines of electroluminescence plate 29 becomes short.

Figure 14:
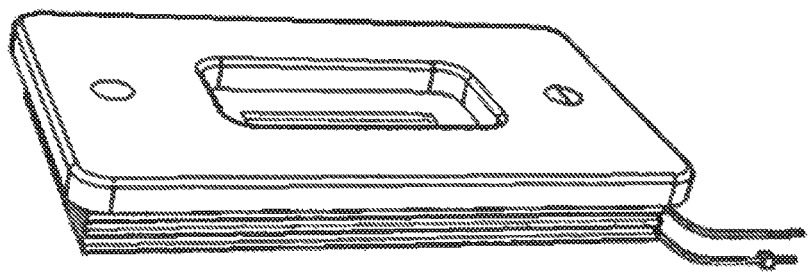
FIG. 14 shows an enlarged perspective view of the initially developed wall switch cover on which the electroluminescence plate is affixed and in which a condenser is attached to a line connected to the electroluminescence plate.

FIG. 14 shows another wall switch cover as a background explanation of the present invention. The wall switch in FIGS. 14 and 15 on which the electroluminescence plate is affixed is formed by using a ready-made condenser.

Figure 15:
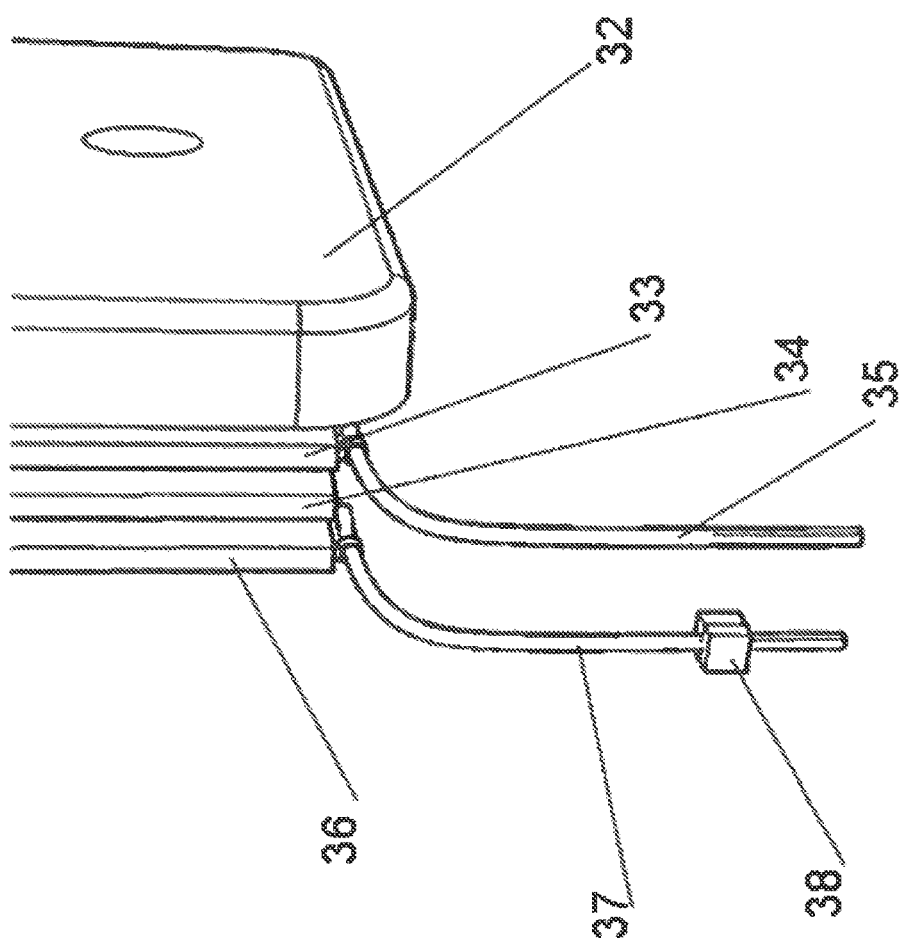
FIG. 15 shows an enlarged perspective view of the initially developed wall switch cover on which the electroluminescence plate is affixed and in which a condenser is attached to a line connected to the electroluminescence plate.

FIG. 15 shows a detailed drawing of the wall switch cover on which the electroluminescence plate is affixed, the idea of which is formulated by using a ready-made condenser.

The wall switch cover in FIGS. 14 and 15 on which the electroluminescence plate is affixed consists of the followings;

First, an anterior switch cover 32;

Second, a transparent conductor plate 33 which is affixed on the inner surface of the anterior switch cover 32 and an electric line 35 attached to the transparent conductor plate 33;

Third, an electroluminescence substance plate 34 which is affixed on the inner surface of the transparent conductor plate 33;

Fourth, another conductor plate 36 which is affixed on the inner surface of the electroluminescence substance plate 34 and an electric line 37 attached to the conductor plate 36, on which a condenser 38 is connected to electric line 37 by series.

Figure 16:
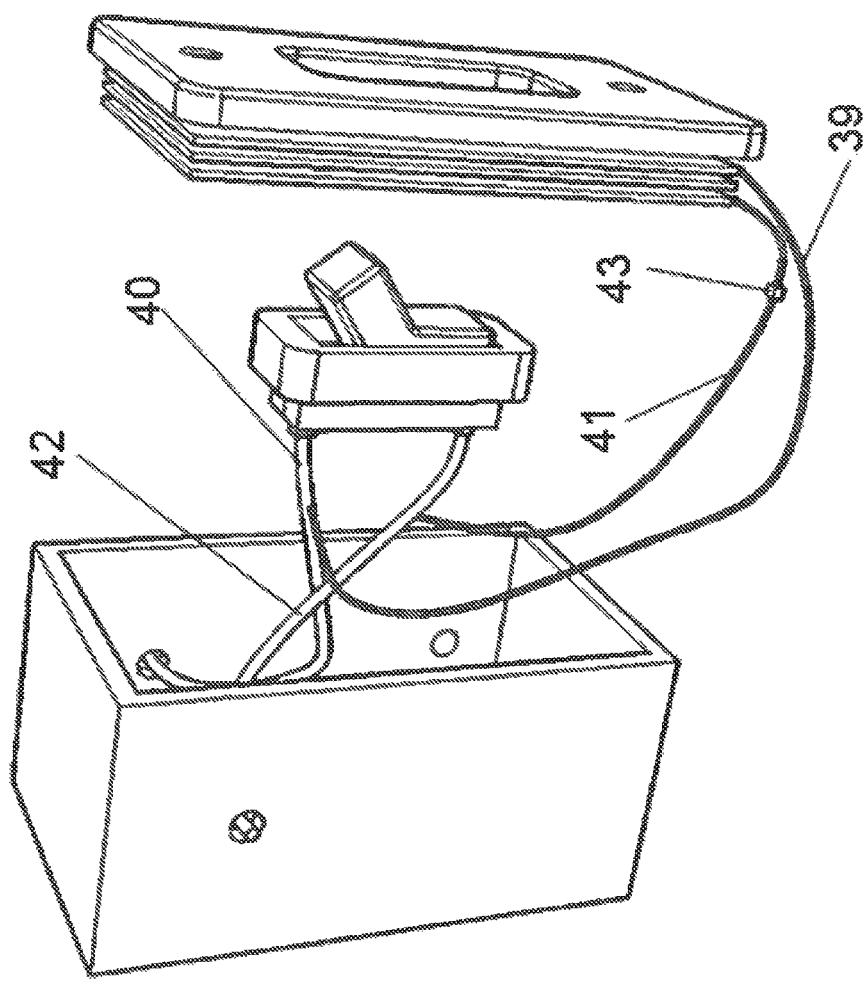
FIG. 16 shows a perspective view of the wall switch lines connected to the the initially developed wall switch cover on which the electroluminescence plate is affixed and in which a condenser is attached to a line connected to the electroluminescence plate.

FIG. 16 shows a connection diagram of the wall switch cover on which the electroluminescence plate is affixed, which is formed by using a ready-made condenser 43.

Front electric line 39 originating from the wall switch over on which the electroluminescence plate is affixed is connected to a power line 40 of the wall switch. Another electric line 39 on which a condenser 43 is connected in series is connected to another power line 42 of the wall switch.

The function of the wall switch cover in FIGS. 15 and 16 on which the electroluminescence plate comprised by using a ready-made condenser is affixed is exactly the same as the function of the wall switch cover shown in FIGS. 11 and 12 on which the electroluminescence plate with a dielectric and conductor plate is affixed.

Accordingly, the present inventor omits the explanation for the function of the wall switch cover in FIGS. 15 and 16 on which the electroluminescence plate comprised by using a ready-made condenser is affixed.

Figure 17:
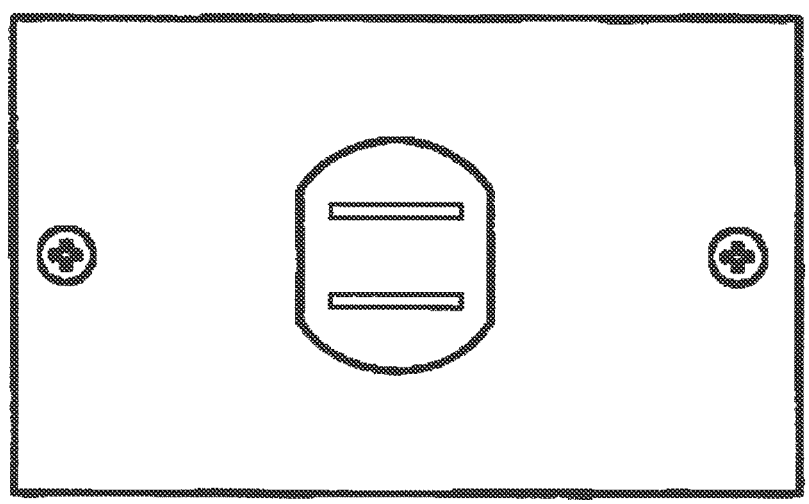
FIG. 17 shows an outside view of the outlet.
Figure 18:
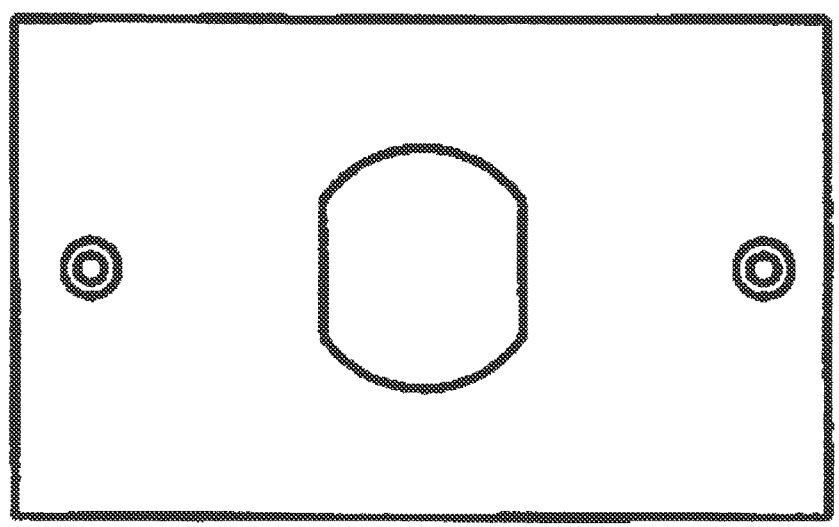
FIG. 18 shows a front view of the outlet.
Figure 19:
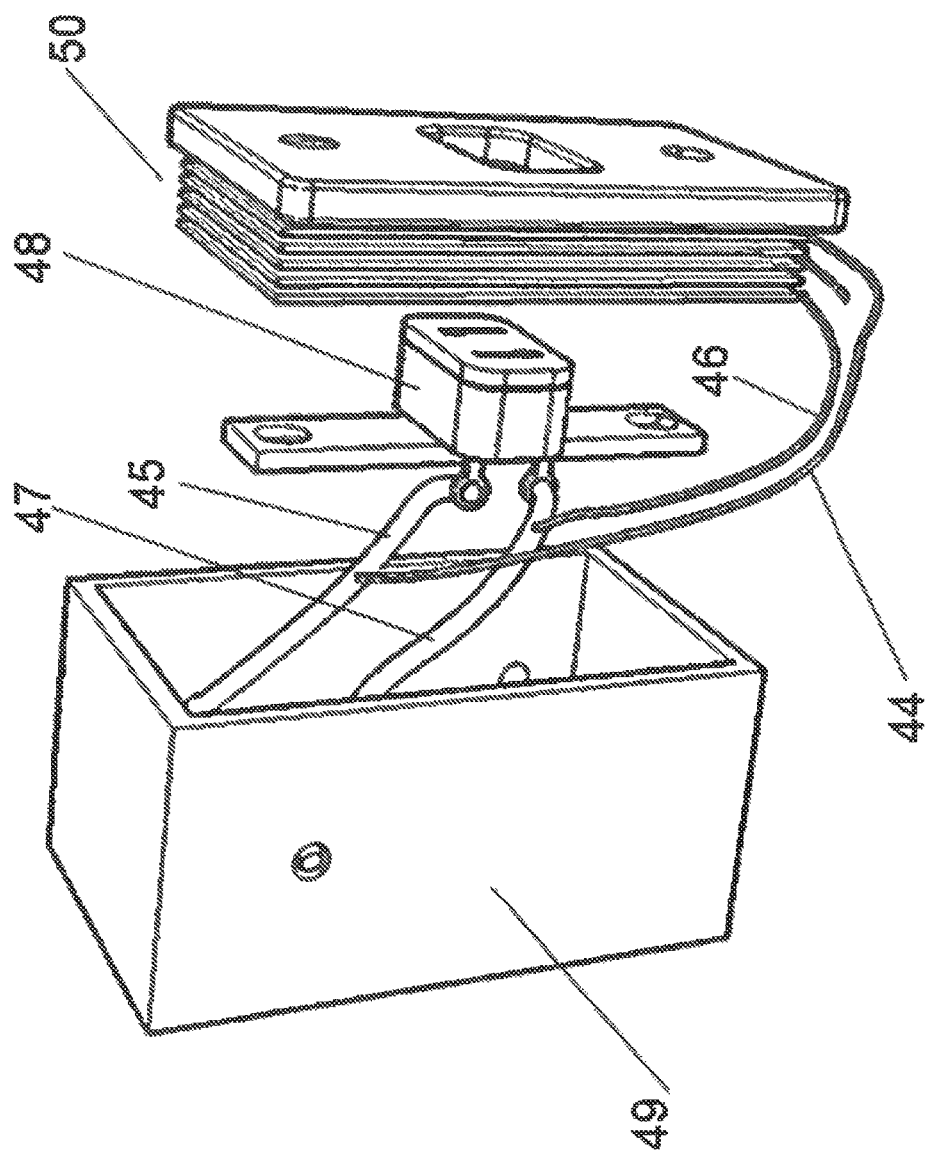
FIG. 19 shows a perspective view of the outlet cover on which the electroluminescence plate with a dielectric plate and a conductor plate is affixed, which is connected to the power lines.

In the same way how the wall switch cover is affixed on the electroluminescence plate, the outlet cover shown in FIGS. 17 and 18 is affixed on the electroluminescence plate with a dielectric and conductor plate 50 as shown in FIG. 19.

FIG. 19 is a connection diagram in which the power line 45 connected to the power outlet 48 belonging to the flushmounted outlet cover 50 is connected to the rear electric line 44 of the outlet cover 50 on which the electroluminescence plate with a dielectric and a conductor plate is affixed and another power line 47 connected to the power outlet 48 is connected to the front electric line 46 of the outlet cover 50 on which the electroluminescence plate with a dielectric and a conductor plate is affixed.

FIG. 20 shows a side elevation view in which the power outlet belonging to flushmounted box 53 is connected to the outlet cover 52 on which the electroluminescence plate with a dielectric and a conductor plate 51 is affixed.

FIG. 21 shows a circuit diagram in which the electroluminescence plate 54 of outlet cover is connected to the power outlet 55.

The electroluminescence plate with a dielectric and a conductor plate 54 emits a light when the electric power 55 is energized into the power outlet but the light becomes dissipated if the electric power into the power outlet is cut off.

What is claimed is:

1. A flushmounted box comprising:
a wall switch cover;
a transparent conductor plate having a first electric line;
an electroluminescence substance plate that is attached on a rear surface of the transparent conductor plate;
a first opaque conductor plate that is attached on a rear surface of the electroluminescence substance plate;
a dielectric plate that is attached on a rear surface of the first opaque conductor plate;
a second opaque conductor plate that is attached on a rear surface of the dielectric plate; and
a second electric line which is connected to the second opaque conductor.

2. A flushmounted box comprising:
an outlet cover;
a transparent conductor plate having a first electric line;
an electroluminescence substance plate that is attached on a rear surface of the transparent conductor plate;
a first opaque conductor plate that is attached on a rear surface of the electroluminescence substance plate;
a dielectric plate that is attached on a rear surface of the first opaque conductor plate;
a second opaque conductor plate that is attached on a rear surface of the dielectric plate; and
a second electric line which is connected to the second opaque conductor.

\* \* \* \* \*